US012801202B2

(12) United States Patent
Huott et al.

(10) Patent No.: US 12,801,202 B2
(45) Date of Patent: Nov. 17, 2026

(54) ENERGY EFFICIENCY USING A POWER SAVING MICRO-GATING CLOCK BUFFER

(71) Applicant: INTERNATIONAL BUSINESS MACHINES CORPORATION, Armonk, NY (US)

(72) Inventors: William V. Huott, Holmes, NY (US); Ann Chen Wu, Hopewell Junction, NY (US); Paul Alan Bunce, Poughkeepsie, NY (US); Mark Cichanowski, Hutto, TX (US); Michael Greene, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/805,769

(22) Filed: Aug. 15, 2024

(65) Prior Publication Data

US 2026/0050317 A1 Feb. 19, 2026

(51) Int. Cl.
*G06F 1/3237* (2019.01)

(52) U.S. Cl.
CPC .................................. *G06F 1/3237* (2013.01)

(58) Field of Classification Search
CPC ..................................................... G06F 1/3237
See application file for complete search history.

(56) References Cited

U.S. PATENT DOCUMENTS 6,654,917 B1 11/2003 Floyd et al.
6,853,212 B2 2/2005 Chandar et al.
7,549,137 B2 6/2009 Alpert et al.
7,844,843 B2 11/2010 Freitas
8,104,014 B2 1/2012 Puri et al.
(Continued)

FOREIGN PATENT DOCUMENTS

WO 2020033064 A1 2/2020

OTHER PUBLICATIONS

Geng et al., "Design of flip-flops with clock-gating and pull-up control scheme for power-constrained and speed-insensitive applications," IET Computers & Digital Techniques, Research Article, IET Journal, vol. 10, Issue 4, https://doi.org/10.1049/iet-cdt.2015.0139, First Published: Jul. 1, 2016, 9 pages.
(Continued)

*Primary Examiner* — Phil K Nguyen
*Assistant Examiner* — Cheri L Harrington
(74) *Attorney, Agent, or Firm* — Onyx IP Group

(57) ABSTRACT

A local clock buffer for improved energy efficiency using a power saving micro-gating clock buffer includes a grid node configured to receive a global clock signal from a global clock grid; an enable gate configured to output a master enable signal based on respective values of two or more enable signals; an enable signal capture latch configured to store a value of the master enable signal; a clock gate configured to output, in dependence upon the stored value of the master enable signal, a pulsed clock signal based on the global clock signal; and micro-gating logic configured to: receive the pulsed clock signal and the two or more enable signals; and output two or more local clock signals using the pulsed clock signal, wherein each local clock signal is selectively output based on a value of one of the two or more enable signals.

20 Claims, 7 Drawing Sheets

400

(56) References Cited

U.S. PATENT DOCUMENTS

| | | | |
|---|---|---|---|
| 8,954,912 B2 | 2/2015 | Alpert et al. | |
| 9,397,641 B2 | 7/2016 | Hsu et al. | |
| 9,762,213 B1 | 9/2017 | Huott et al. | |
| 10,162,914 B1 * | 12/2018 | Krishnamurthy | G06F 16/24557 |
| 10,205,454 B2 | 2/2019 | Lapiana | |
| 10,333,500 B1 | 6/2019 | Vickers et al. | |
| 10,650,112 B1 * | 5/2020 | Krishnamurthy | H03K 3/037 |
| 10,726,180 B1 * | 7/2020 | Chang | G06F 30/30 |
| 10,784,864 B1 * | 9/2020 | Berzins | H03K 19/0016 |
| 10,878,152 B1 * | 12/2020 | Neves | G06F 30/392 |
| 10,944,401 B1 * | 3/2021 | Kim | H03K 19/0016 |
| 11,092,649 B2 | 8/2021 | Berzins | |
| 2003/0208702 A1 * | 11/2003 | Smetana | G06F 1/10 713/400 |
| 2007/0101221 A1 | 5/2007 | Fredrickson et al. | |
| 2007/0229134 A1 * | 10/2007 | Hamdan | G06F 1/04 327/291 |
| 2008/0028357 A1 | 1/2008 | Shimony | |
| 2009/0199038 A1 * | 8/2009 | Sigal | G06F 1/12 713/600 |
| 2011/0043260 A1 * | 2/2011 | Hart | G06F 1/10 327/155 |
| 2011/0271128 A1 | 11/2011 | Cressman | |
| 2013/0021072 A1 * | 1/2013 | Wang | G06F 1/324 327/145 |
| 2013/0067292 A1 | 3/2013 | Tang et al. | |
| 2013/0326451 A1 | 12/2013 | Cho et al. | |
| 2014/0164860 A1 | 6/2014 | Kim | |
| 2015/0084673 A1 | 3/2015 | Fleischer et al. | |
| 2015/0168992 A1 * | 6/2015 | Choi | H03K 19/017509 327/108 |
| 2016/0049937 A1 | 2/2016 | Tong et al. | |
| 2018/0062658 A1 * | 3/2018 | Hsu | H03K 19/0013 |
| 2023/0208424 A1 | 6/2023 | Baksh et al. | |
| 2023/0396250 A1 | 12/2023 | Tsai et al. | |
| 2025/0271501 A1 | 8/2025 | Kawoosa et al. | |

OTHER PUBLICATIONS

Huott et al., Improving Energy Efficiency Using a Power Saving Clock Buffer for Clock Grid-Based Scanning, International Business Machines Corporation (IBM), U.S. Appl. No. 18/805,984, filed Aug. 15, 2024, 32 pages.

Kim et al., "Pulser Gating: A Clock Gating of Pulsed-Latch Circuits," 16th Asia and South Pacific Design Automation Conference (ASP-DAC 2011), Yokohama, Japan, Date of Conference: Jan. 25-28, 2011, DOI: 10.1109/ASPDAC.2011.5722182, Date Added to IEEE Xplore: Mar. 3, 2011, 7 pages.

Ng et al., "Double Edge-Triggered Half-Static Clock-Gating D-Type Flip-Flop," Solid State Electronics Letters, vol. 3, https://doi.org/10.1016/j.ssel.2021.08.001, Dec. 2021, 4 pages.

Appendix P; List of IBM Patent or Applications Treated as Related, Oct. 29, 2024, 2 pages.

Srinivasan et al., Power reduction by Clock Gating Technique, Elsevier, ScienceDirect, Smart Grid Technologies, Aug. 6-8, 2015, Procedia Technology, vol. 21, 2015, pp. 631-635, DOI: 10.1016/j.protcy.2015.10.075, Dec. 2015, 5 pages.

Vo et al., "Hybrid Data Driven Clock Gating and Data Gating Technique for Better Saving Power in ALU RISC-V," International Journal of Electrical and Electronics Research (IJEER), vol. 12, Issue 1, Published Mar. 20, 2024, 9 pages.

Wagle et al., "A New Approach to Clock Skewing for Area and Power Optimization of ASICs Using Differential Flipflops and Local Clocking," IEEE Transactions on Computer-Aided Design of Integrated Circuits and Systems , vol. 42, No. 1, DOI: 10.1109/TCAD.2023.3264798, Date of Publication: Apr. 5, 2023, 13 pages.

* cited by examiner

ENERGY EFFICIENCY USING A POWER SAVING MICRO-GATING CLOCK BUFFER

BACKGROUND

The present disclosure relates to methods, apparatus, and products for improved energy efficiency using a power saving micro-gating clock buffer. In a synchronous digital system, a clock signal is used to define a time reference for the movement of data within the system. The clock distribution network, or clock grid, distributes the clock signal from a common point to all the elements that need the clock signal. Switching in clocked components consumes power, dissipates heat, and generates noise. Thus, it is inefficient or impossible to keep all clocked components connected to the clock grid all of the time. Rather, components are organized into clock domains that can be turned on and off. When elements of a particular clock domain are not being used, the clock supplied to that particular clock domain can be turned off to conserve power. This is referred to as clock gating.

SUMMARY

According to embodiments of the present disclosure, various methods, apparatus and products for improved energy efficiency using a power saving micro-gating clock buffer are described herein. A local clock buffer is attached to a global clock grid at a single grid connection node. The local clock buffer is configured to output two or more local clock signals corresponding to two or more different clock domains based on respective enable signals for those domains. A common latch is used for both enable signals. A local clock signal is provided to a particular clock domain only if the enable signal for that clock domain is active. If no enable signals are asserted, the local clock buffer turns off all connected clock domains. In this way, only one latch is used to capture an enable signal, but different clock domains that are tied to that latch may be turned on and off independently.

In some aspects, improved energy efficiency using a power saving micro-gating clock buffer includes a local clock buffer that dynamically and independently operates multiple clock domains using a single enable capture latch and micro-gating logic. In an example, the local clock buffer includes a grid node configured to receive a global clock signal from a global clock grid; an enable gate configured to output a master enable signal based on respective values of two or more enable signals. The local clock buffer also includes an enable signal capture latch configured to store a value of the master enable signal. The local clock buffer also includes a clock gate configured to output, in dependence upon the stored value of the master enable signal, a pulsed clock signal based on the global clock signal. The local clock buffer also includes micro-gating logic configured to receive the pulsed clock signal and the two or more enable signals, and to output two or more local clock signals using the pulsed clock signal, where each local clock signal is selectively output based on a value of one of the two or more enable signals.

DETAILED DESCRIPTION

Figure 1:
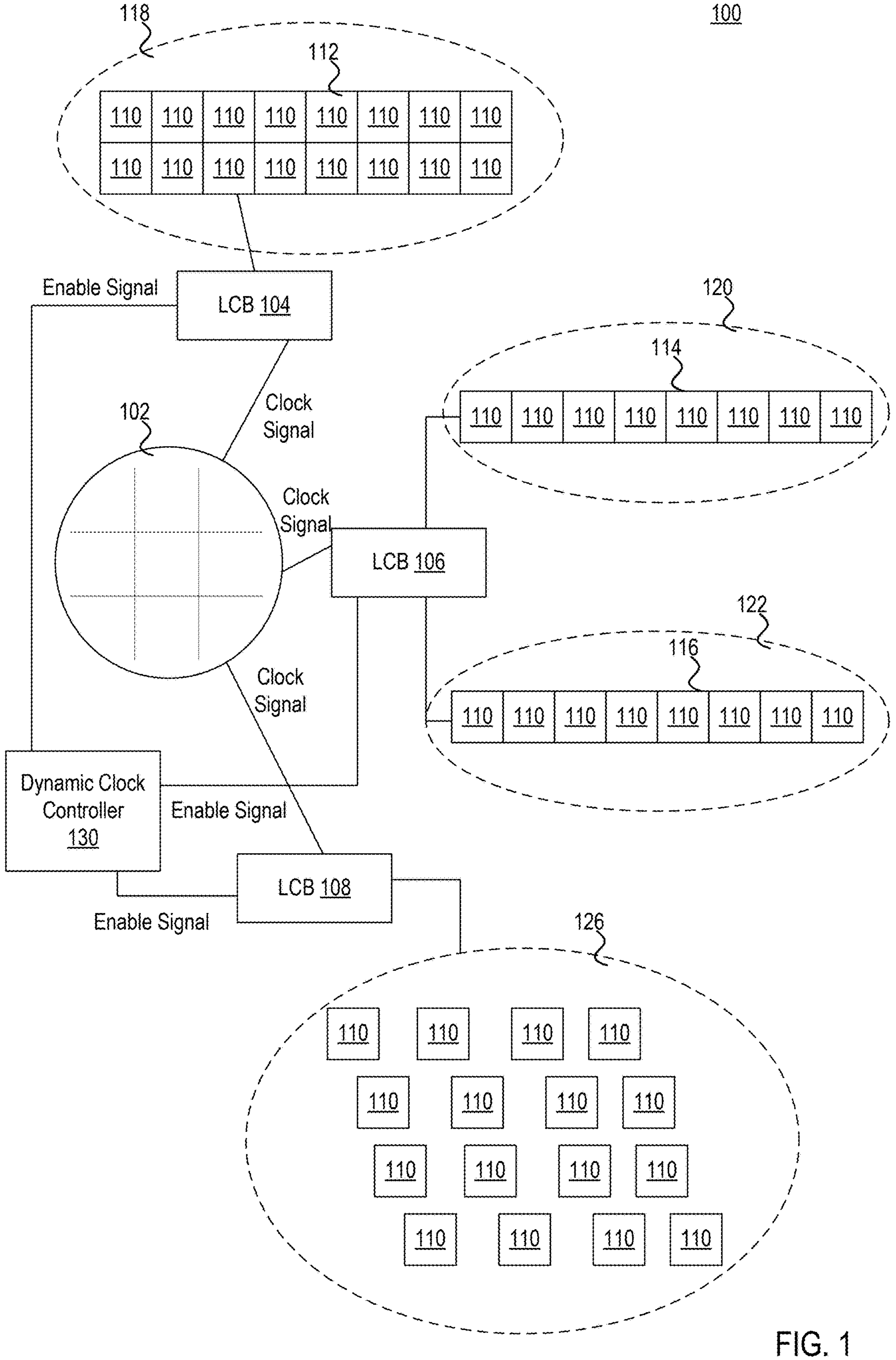
FIG. 1 sets forth an environment for improved energy efficiency using a power saving micro-gating clock buffer in accordance with at least one embodiment of the present disclosure.

Synchronous digital systems are described in the context of signals, gates, and logic. As used herein, the terms “high,” “active,” and “logic one” are used interchangeably to refer to a signal or value that is asserted, where an asserted signal meets, for example, a certain voltage threshold. The terms “low,” “inactive,” and “logic zero” are used interchangeably to refer to a signal or value that is not asserted (i.e., unasserted). Logic-level descriptions of digital systems are discussed below. It will be appreciated that implementations of logic-level designs, including transistor-level implementations, may vary without departing from the spirit of the present disclosure.

In a synchronous digital system, a clock signal is used to define a time reference for the movement of data within the system. The clock distribution network, or clock grid, distributes the clock signal from a common point to all the elements that need the clock signal. Constructing a clock network for microprocessors is becoming increasingly difficult with new process technologies and as circuit complexity increases. In particular, power dissipation has become a limiting factor for the yield of low power, high-performance circuit designs. Clock networks can contribute a large share of the total active power in multi-GHz designs. Low power designs are preferable since they exhibit less power supply noise and provide better tolerance with regard to manufacturing variations.

There are several techniques for minimizing power while still achieving timing objectives for high performance, low power systems. One technique uses local clock buffers (LCBs) to distribute the clock signals. A typical clock control system has a clock generation circuit that generates a global clock signal which is fed to a clock distribution network that renders synchronized global clock signals at the LCBs. Each LCB adjusts the global clock duty cycle and edges to meet the requirements of respective circuit elements, e.g., local logic circuits or latches. In some techniques, clock grids are divided into clock domains that are gated by LCBs. Clock domains are distinct regions of the chip where the clock signal, which synchronizes the operations of the circuits, can operate at different frequencies or phases or may be turned completely off. Each clock domain operates independently and can be used to optimize performance, reduce power consumption, and manage the complexity of the design. Clock gating is a technique used to reduce power consumption by turning off the clock signal to certain clock domains when those areas of the microprocessor are not in use.

With technology scaling, the number of latches is growing exponentially and the number of LCBs along with them. LCB power in connecting to the high-speed global clock distribution does not scale with technology due to metal capacitance. Therefore, it is advantageous to reduce global clock grid power by minimizing the number of LCBs attached to the global clock distribution as well as LCB power related to the need for multiple clock gating domains.

To minimize the number of LCBs, multiple clock domains are often driven by the same LCB rather than providing an LCB for each individual clock domain. That is, an LCB can drive a certain number of microprocessor components (e.g., latches). When clock domains contain less than that certain number of connected components, it is advantageous to combine multiple clock domains onto the same LCB to fully utilize the LCB. However, this has a drawback in that these multiple clock domains are turned on and off in tandem. Thus, where two clock domains are coupled to the same LCB, both clock domains receive an active clock signal even if only one clock domain requires the active clock signal. Activating the unused clock domain needlessly consumes power and dissipates heat.

To minimize the number LCBs in a microprocessor design while still achieving the full benefit of clock domain gating, embodiments in accordance with the present disclosure provide micro-gating in which clock domains that are attached to the same LCB and driven by a single capture latch are independently enabled and disabled. A local clock buffer includes a grid node configured to receive a global clock signal from a global clock grid; an enable gate configured to output a master enable signal based on respective values of two or more enable signals. The local clock buffer also includes an enable signal capture latch configured to store a value of the master enable signal. The local clock buffer also includes a clock gate configured to output, in dependence upon the stored value of the master enable signal, a pulsed clock signal based on the global clock signal. The local clock buffer also includes micro-gating logic configured to receive the pulsed clock signal and the two or more enable signals, and to output two or more local clock signals using the pulsed clock signal, where each local clock signal is selectively output based on a value of one of the two or more enable signals. As used herein, turning on a clock domain means providing a switching clock signal to clocked elements connected to that clock domain, while turning off a clock domain means discontinuing a switching clock signal to those clocked elements. The clocked elements may be, for example, latches for data such as the latches that compose a processor register as well as other sequential logic elements.

Turning to FIG. 1, FIG. 1 illustrates an example environment 100 for improved energy efficiency using a power saving micro-gating clock buffer in accordance with at least one embodiment of the present disclosure. The environment 100 may be embodied in, for example, a processor or other digital logic device. The environment 100 includes a global clock grid 102 and multiple LCBs 104, 106, 108. Each LCB 104, 106, 108 is designed to drive a particular number of data latches 110. For example, in an environment where 64-bit registers are frequently used it may be expected that one LCB is used to drive 64 latches. However, that same environment may include other registers such as 8-bit, 16-bit, or 32-bit registers. To minimize the number of LCBs in the design, each LCB should be attached to the full number of latches that it can support. Thus, in a 64-bit environment it is more efficient to attach two 32-bit registers to the same LCB. However, those two 32-bit registers may not always be in use at the same time. Thus, there may be a power tradeoff between the power consumption of an additional LCB and the power consumption of unused latches. Further, adding additional LCBs also impacts spatial efficiency and increases circuit complexity, thus making it more difficult to produce designs that conform to design rules, tolerances, and manufacturing requirements.

To simplify illustration and explanation, consider that the environment 100 supports, for example, 16 latches per LCB. Accordingly, in the example of FIG. 1, LCB 104 is connected to a 16-bit register 112 composed of 16 latches. These latches form a first clock domain 118 as they are required to be clocked by the same clock signal. LCB 106 is connected to two 8-bit registers 114, 116 each composed of 8 latches. One 8-bit register 114 may form a second clock domain 120 and the other 8-bit register may form a third clock domain 122. As register 114 may not require the same clock signal as register 116, or register 114 may be used when register 116 is not, the latches 110 of register 114 and the latches 110 of register 116 may be separated into different clock domains. It should be appreciated that registers are used as an example in FIG. 1, and that the scope of the present disclosure is not limited only driving latches that are components of registers. For example, in FIG. 1, a fourth clock domain 126 coupled to LCB 108 includes latches 110 that a clocked together but not organized as a register. The LCBs 104, 106, 108 are enabled and disabled via enable signals from a dynamic clock controller 130.

As mentioned above, LCBs may be used to turn off a clock domain, i.e., to disable the clock used by elements in a clock domain, in order to reduce power consumption when those elements are not in use. This is referred to as clock gating. For example, when a register is not being used for a particular computation, it may be advantageous to stop clocking the latches in that register as this needlessly consumes power. However, if a conventional LCB is used for clock gating, then for fine clock gating control each clock domain must be coupled to its own LCB. Because it is preferable to minimize the number of LCBs, multiple clock domains coupled to an LCB are typically gated together even though they may be independent. To address this issue, one technique shown in FIG. 2 uses multiple clock capture latches to drive respective independent local clock signals for respective clock domains.

Figure 2:
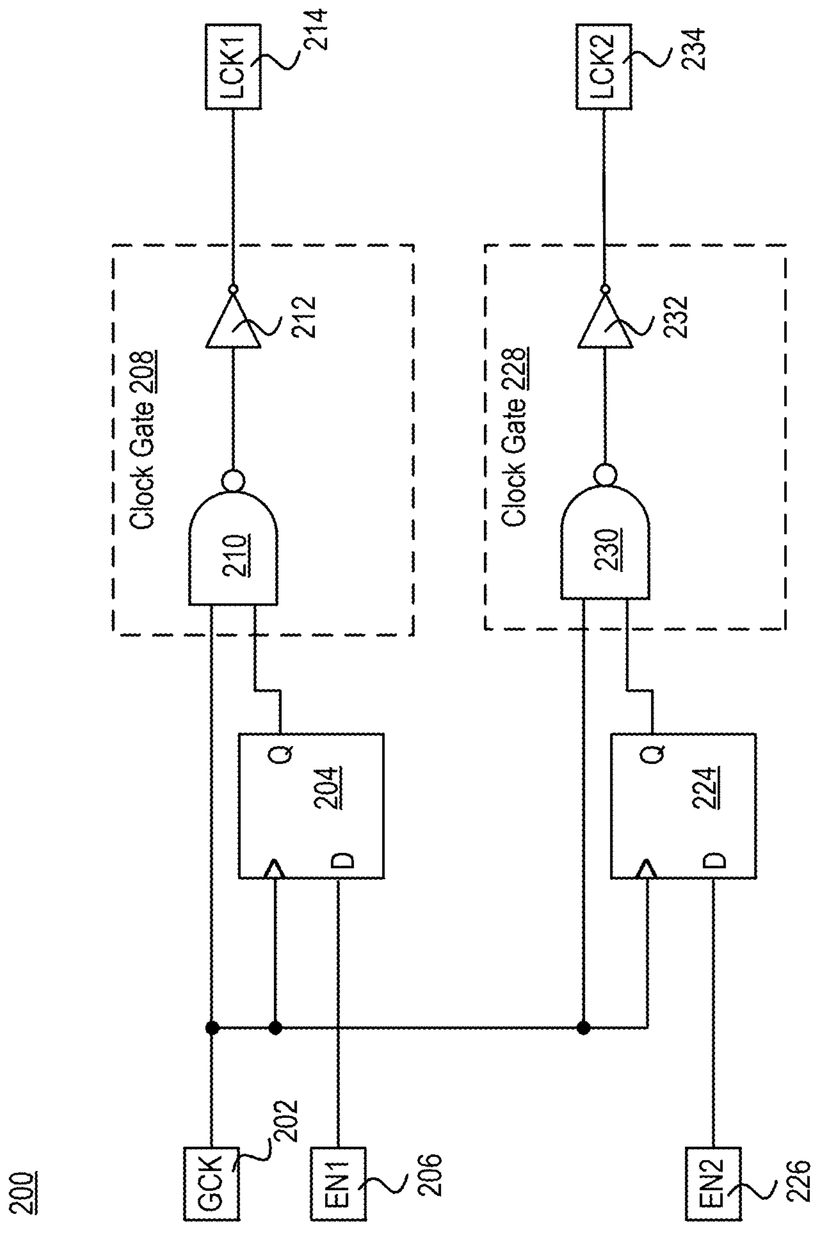
FIG. 2 sets forth an example local clock buffer.

For further explanation, FIG. 2 illustrates an example local clock buffer 200 that employs micro-gating. The example local clock buffer can provide a first local clock signal LCK1 to a first clock domain and a second local clock signal to a second clock domain. The example of local clock buffer 200 of FIG. 2 includes a grid node 202 that receives a global clock signal GCK from the clock grid (e.g., global clock grid 102 in FIG. 1). The example local clock buffer 200 further includes a first capture latch 204 that includes a clock input and an enable signal input. The clock input receives the clock signal GCK from the grid node 202. The enable input receives an enable signal EN1 from a first enable input node 206. The first capture latch 204 captures the value of the first enable signal EN1 on the rising edge of the global clock signal GCK. The example local clock buffer further includes a first clock gate 208. In this example, the first clock gate 208 is implemented as a NAND gate 210 and an inverter 212, although it will be appreciated that the first clock gate 208 may be implemented using different logic. The first clock gate 208 receives the global clock signal GCK at a first input and the output of the first capture latch 204 at a second input. The inputs are NAND'd and the output is inverted by the inverter 212. The output of the inverter 212 is supplied to the first local clock node 214 as the first local clock signal LCK1.

The example local clock buffer 200 further includes a second capture latch 224 that includes a clock input and an enable signal input. The clock input receives the clock signal GCK from the grid node 202. The enable input receives an enable signal EN2 from a second enable input node 226. The second capture latch 204 captures the value of the second enable signal EN2 on the rising edge of the global clock signal GCK. The example local clock buffer further includes a second clock gate 208. In this example, the second clock gate 228 is implemented as a NAND gate 230 and an inverter 232, although it will be appreciated that the second clock gate 228 may be implemented using different logic. The second clock gate 228 receives the global clock signal GCK at a first input and the output of the second capture latch 224 at a second input. The inputs are NAND'd and the output is inverted by the inverter 232. The output of the inverter 232 is supplied to the second local clock node 234 as the second local clock signal LCK2.

Thus, in operation, the example local clock buffer 200 is operable to receive the first enable signal EN1 and output the first local clock signal LCK1 when the first enable signal EN1 is active. When the first enable signal EN1 is not active (i.e., low in this example), the local clock buffer 200 does not output the first local clock signal LCK1 (i.e., LCK1 is no longer switched between active and inactive clock cycle phases). The example local clock buffer 200 is also operable to receive the second enable signal EN2 and output the second local clock signal LCK2 when the second enable signal EN2 is active. When the second enable signal EN2 is not active (i.e., low in this example), the local clock buffer 200 does not output the second local clock signal LCK2 (i.e., LCK2 is no longer switched). Effectively, the local clock buffer is operable to turn a first clock domain and a second clock domain on and off based the enable signals EN1 and EN2, respectively.

However, the example local clock buffer 200 requires two capture latches to provide the first local clock signal and the second local clock signal; in other words, one capture latch is required for each local clock signal. These multiple capture latches are "always-on" in that they are gated by the global clock signal and continuously consume power in evaluating the enable input and the clock input. Thus, although the local clock buffer 200 may achieve some power savings by gating multiple clock domains connected to the local clock buffer 200, the amount of power consumed by the corresponding capture latches scales with the number of clock domains that are connected; thus, incorporating multiple always-on latches leads to power inefficiencies.

Figure 3:
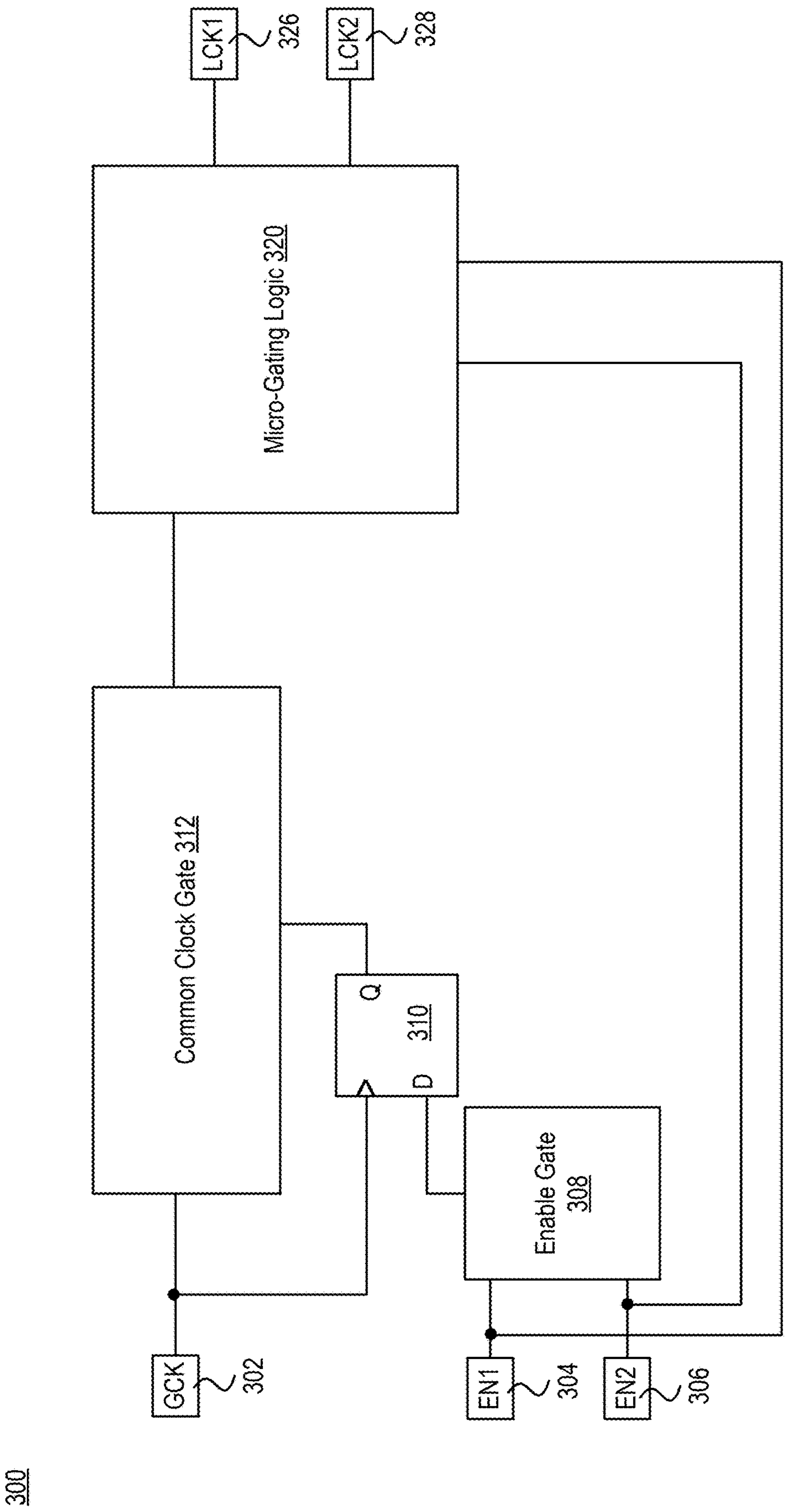
FIG. 3 sets forth an example local clock buffer for improved energy efficiency using a power saving micro-gating clock buffer in accordance with at least one embodiment of the present disclosure.

In accordance with embodiments of the present disclosure, improved energy efficiency using a power saving micro-gating clock buffer is accomplished using a single latch for reduced power consumption in the local clock buffer. For further explanation, FIG. 3 sets forth a block diagram of an example local clock buffer 300 for improved energy efficiency using a power saving micro-gating clock buffer in accordance with at least one embodiment of the present disclosure. The example local clock buffer 300 includes a grid node 302 that receives a global clock signal GCK from the clock grid (e.g., global clock grid 102 in FIG. 1). The example local clock buffer 300 is configured to receive a first enable signal EN1 at a first enable input node 304 and a second enable signal EN2 at a second enable input node 306 (e.g., from a dynamic clock controller such as clock controller 130 in FIG. 1). The example local clock buffer 300 also includes an enable gate 308 that outputs logic one when either EN1 or EN2 is high. It will be appreciated, though, that the local clock buffer can include any number of enable input nodes for receiving any number of enable signals. The example local clock buffer 300 also includes only one capture latch 310 for latching the output of the enable gate 308.

The example local clock buffer 300 further includes a common clock gate 312. The common clock gate 312 receives the global clock signal GCK at a first input and the output of the single capture latch 310 at a second input. Thus, the global clock signal is gated based on the value of the enable signals EN1, EN2. The output of the common clock gate 312 is propagated to micro-gating logic 320 that operates to multiplex the output of the common clock gate based on the first enable signal EN1 and the second enable signal EN2, which can scale to any number of enable signals for any number of clock domains. The micro-gating logic 320 is configured to receive the first enable signal EN1 and the second enable signal EN2. When the first enable signal EN1 is active, the micro-gating logic 320 outputs a local clock signal LCK1 based on GCK. When the first enable signal EN1 is inactive, the micro-gating logic 320 does not output a clock signal (i.e., LCK1 is not switched). When the second enable signal EN2 is active, the micro-gating logic 320 outputs a local clock signal LCK2 based on GCK. When the second enable signal EN2 is inactive, the micro-gating logic 320 does not output a clock signal (i.e., LCK2 is not switched). It will be appreciated that the number of local clock signals is not limited two.

Thus, the micro-gating logic 320 outputs a first local clock signal LCK1 based on the global clock signal GCK that is gated by the common clock gate 312, when the first enable signal EN1 is active. The micro-gating logic 320 outputs a second local clock signal LCK2 based on the global clock signal GCK that is gated by the common clock gate 312, when the second enable signal EN2 is active. A first clock domain (e.g., clock domain 118 in FIG. 1) can be coupled to a first local clock node 326 for receiving LCK1. A second clock domain (e.g., clock domain 120 in FIG. 1) can be coupled to a first local clock node 328 for receiving LCK2. The enable signals EN1, EN2 are thus used to turn on and off the respective local clocks of the first clock domain and the second clock domain, independently of one another. Accordingly, multiple micro-clock domains can be driven and enabled/disabled from a single clock grid-connected clock buffer (instead of one grid connection per clock domain). The local clock buffer 300 utilizes a single capture latch 310 for latching a value from multiple enable signals while providing independent micro-gating for the multiple clock domains using those enable signals via the micro-gating logic, and thus reduces the always-on power consumption of a local clock buffer configured for micro-gating multiple clock domains.

Figure 4:
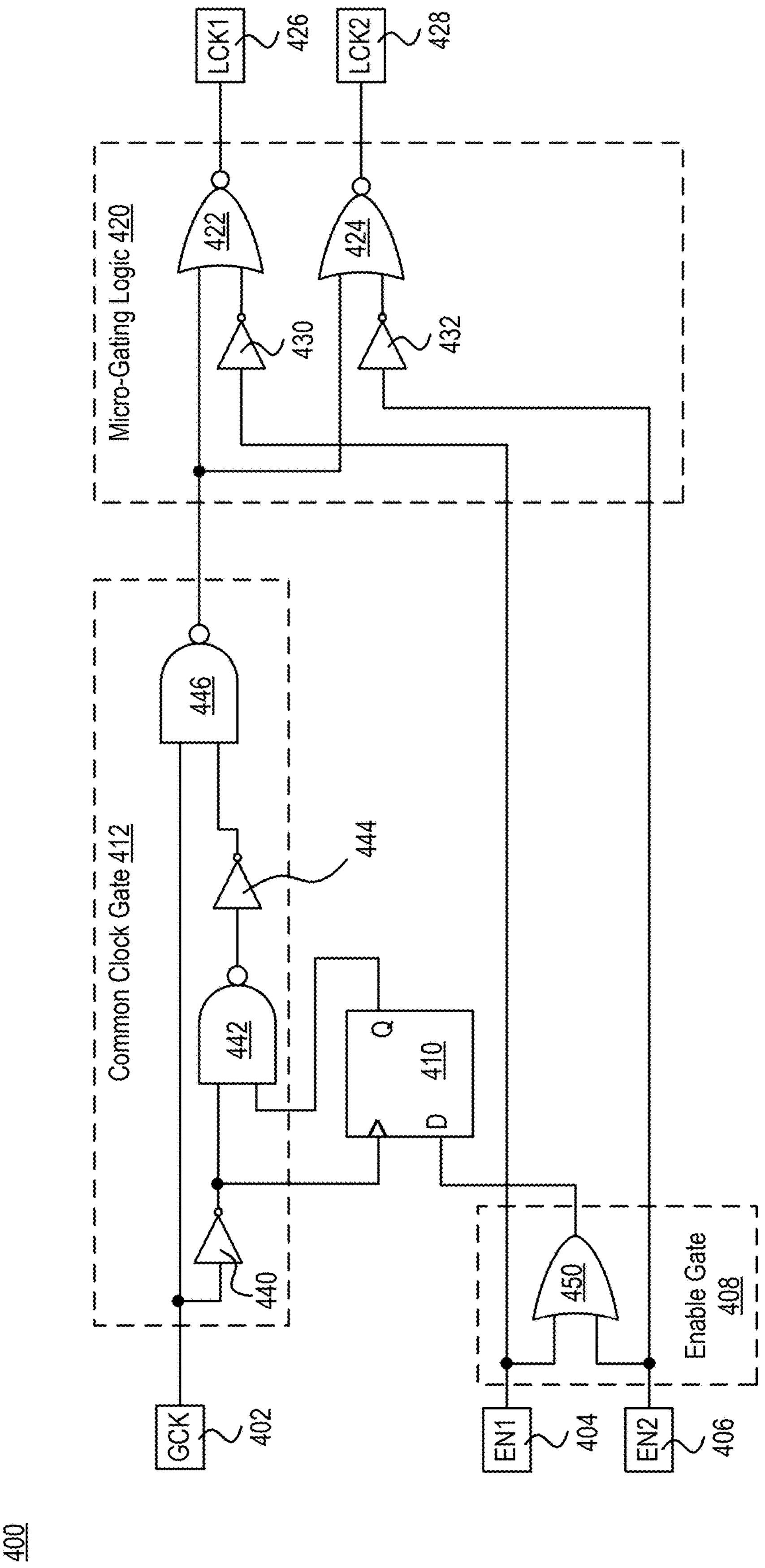
FIG. 4 sets forth another example local clock buffer for improved energy efficiency using a power saving micro-gating clock buffer in accordance with at least one embodiment of the present disclosure.

FIG. 4 sets forth a logic diagram for another example implementation of a local clock buffer (e.g., the local clock buffer 300 of FIG. 3) for improved energy efficiency using a power saving micro-gating clock buffer in accordance with at least one embodiment of the present disclosure. FIG. 4 illustrates an edge-triggered design in which the active pulse of the local clocks is contracted compared to the global clock signal. This ensures that a change in the value of an upstream latch during an active clock signal is not propagated to the downstream latch prematurely (also referred to as an early mode problem).

The example local clock buffer 400 of FIG. 4 includes a grid node 402 that receives a global clock signal GCK from the clock grid (e.g., global clock grid 102 in FIG. 1). The example local clock buffer 400 also includes a first enable input node 404 configured to receive and first enable signal EN1 and a second enable input node 406 configured to receive a second enable signal EN2. It will be appreciated, though, that the local clock buffer can include any number of enable input nodes for receiving any number of enable signals for any number of clock domains. The example local clock buffer 400 also includes an enable gate 408. In the example of FIG. 4, the enable gate 408 is implemented as an OR gate 450; however, it will be appreciated that other logic can be used to implement the enable gate 408. The OR gate 450 outputs logic one whenever either enable signal is high.

The example local clock buffer 400 also includes a single enable signal capture latch 410 that includes a clock input and an enable signal input. The clock input receives the inverted global clock signal GCK from an inverter 440 coupled to the grid node 402. The enable input receives an enable signal from enable gate 408. The capture latch 410 latches and outputs the value of the enable input on the falling edge the global clock signal. That is, the single capture latch 410 latches a logic one whenever either the first enable signal EN1 or the second enable signal EN2 is asserted.

The example local clock buffer 400 further includes a common clock gate 412. In this example, the common clock gate 412 is implemented as a clock chopping gate. In a clock chopping gate that is driven by a master clock, such as the global clock signal GCK, the output of the clock chopping gate goes high in response to the master clock going high; however, the chopped clock signal has a shorter pulse than the master clock, and thus goes low before the master clock goes low. Thus, the shorter pulse-width reduces the risk that a value in an upstream latch will change during the active pulse will be prematurely propagated to the downstream latch. An example implementation of clock chopping gate for the common clock gate 412 is shown in FIG. 4; however, it will be appreciated that other logic may be used to implement a chopped clock signal.

The example clock chopping implementation of the common clock gate 412 includes a first NAND 442 that receives the inverted global clock signal GCK from the inverter 440 as a first input and the enable value stored in the capture latch 410 as a second input. The output of the first NAND 442 is inverted by a second inverter 444 and propagated to a first input of a second NAND 446. Accordingly, the signal path through the first inverter 440, the first NAND 442, and the second inverter 444 acts to delay the value of GCK to the first input of the second NAND 446. This slow signal path is gated by the output of the enable gate 408. The NAND 446 also receives the global clock signal GCK at a second input. Thus, when the global clock signal GCK transitions to active, the second NAND 446 evaluates the value of GCK in the current clock phase and the inverted value of GCK in the previous clock phase for a period of three gate delays. In other words, the second NAND 446 evaluates a logic one at the GCK input and a logic one at the slow signal path input until the logic zero being propagated through the slow signal path catches up the second NAND 446. Accordingly, the output of the common clock gate 412 is a chopped clock signal having pulse that is equal to approximately three gate delays. The pulse width of the chopped clock signal, and thus the functional local clock signal, can be controlled by the number of delays inserted in the slow signal path to NAND 446.

In an example operation, when both enable signals EN1, EN2 are logic zero (i.e., unasserted), the local clock buffer 400 is not enabled and the capture latch 410 stores a value of logic zero. As such, NAND 446 always evaluates to logic one regardless of GCK because the input to NAND 446 from the delay signal path is always logic zero. When either of the enable signals EN1, EN2 is asserted high, the value of logic one is not latched until the falling edge of GCK because the clock input of the latch 410 is connected to inverter 440. This ensures that the local clock buffer 400 cannot be enabled during an active phase of GCK, which could cause a clock glitch in domains coupled to the local clock buffer 400. After the local clock buffer 400 is enabled, the common clock gate will output a value of logic one while GCK is inactive. Of note, the input to NAND 446 from the delay signal path is logic one coming from inverter 444. When GCK transitions to active, the input to NAND 446 from GCK is logic one and the input to NAND 446 is also still logic one because the inverted GCK has not yet propagated through the delay signal path. NAND 446 thus evaluates to logic zero. Once inverted GCK propagates through to NAND 446, NAND 446 returns to evaluating to logic one. Thus, the common clock gate 412 outputs logic one except for a window following a transition of GCK from inactive to active, during which time the common clock gate outputs logic zero. That window corresponds to a pulse width that is shorter than the pulse width of GCK and is equal to the number of gate delays between the grid node 402 and NAND 446.

The local clock buffer 400 also includes a micro-gating logic 420 that receives the gated clock signal from the common clock gate 412. The micro-gating logic 420 also receives and inverts the first enable signal EN1 and the second enable signal EN2. In the example of FIG. 4, an implementation of the micro-gating logic 420 includes a first NOR gate 422 that receives, as inputs, the output of the common clock gate 412 and the inverted first enable signal from inverter 430. When the first enable signal EN1 is active, the micro-gating logic 420 outputs a pulsed clock signal LCK1 based on GCK. When the first enable signal EN1 is inactive, the micro-gating logic 420 does not output a pulsed signal (i.e., LCK1 is not switched). In this implementation, the micro-gating logic 420 also includes a second NOR gate 424 that receives, as inputs, the output of the common clock gate 412 and the inverted second enable signal from inverter 432. When the second enable signal EN2 is active, the micro-gating logic 420 outputs a pulsed clock signal LCK2 based on GCK. When the second enable signal EN2 is inactive, the micro-gating logic 420 does not output a pulsed signal (i.e., LCK2 is not switched).

In operation, NOR gate 422 receives logic one from inverter 430 when EN1 is inactive, and thus evaluates to logic zero regardless of the output of the common clock gate 412. In this way, EN1 is used to micro-gate a first clock domain (e.g., clock domain 118 in FIG. 1) independent of any other clock domain connected to the common clock gate 412. When EN1 is active, NOR gate receives logic zero from inverter 430 and thus generates a pulsed local clock LCK1 having a pulse width equal to the pulse width of the chopped clock signal output by the common clock gate 412. That is, when the common clock gate 412 outputs logic zero for the pulse width following the transition of GCK from low to high, NOR gate 422 outputs logic one and otherwise outputs logic zero.

NOR gate 424 receives logic one from inverter 432 when EN2 is inactive, and thus evaluates to logic zero regardless of the output of the common clock gate 412. In this way, EN2 is used to micro-gate a second clock domain (e.g., clock domain 118 in FIG. 1) independent of any other clock domain connected to the common clock gate 412. When EN2 is active, NOR gate receives logic zero from inverter 432 and thus generates a pulsed local clock LCK2 having a pulse width equal to the pulse width of the chopped clock signal output by the common clock gate 412. That is, when the common clock gate 412 outputs logic zero for the pulse width following the transition of GCK from low to high, NOR gate 422 outputs logic one and otherwise outputs logic zero.

Thus, the micro-gating logic 420 outputs a first local clock signal LCK1 as a pulsed clock signal, based on the global clock signal GCK, when the first enable signal EN1 is active. The micro-gating logic 420 outputs a second local clock signal LCK2 as a pulsed clock signal, based on the global clock signal GCK, when the second enable signal EN2 is active. A first clock domain (e.g., clock domain 118 in FIG. 1) can be coupled to a first local clock node 426 for receiving LCK1. A second clock domain (e.g., clock domain 120 in FIG. 1) can be coupled to a second local clock node 428 for receiving LCK2. The enable signals EN1, EN2 are thus used to turn on and off the respective local clocks of the first clock domain and the second clock domain, independently of one another. Accordingly, multiple micro-clock domains can be driven and enabled/disabled from a single clock grid-connected clock buffer (instead of one grid connection per clock domain). The local clock buffer 400 utilizes only one capture latch for multiple enable signals while providing independent micro-gating for the multiple clock domains using those enable signals, and thus reduces the always-on power consumption of a local clock buffer configured for micro-gating multiple clock domains.

Figure 5:
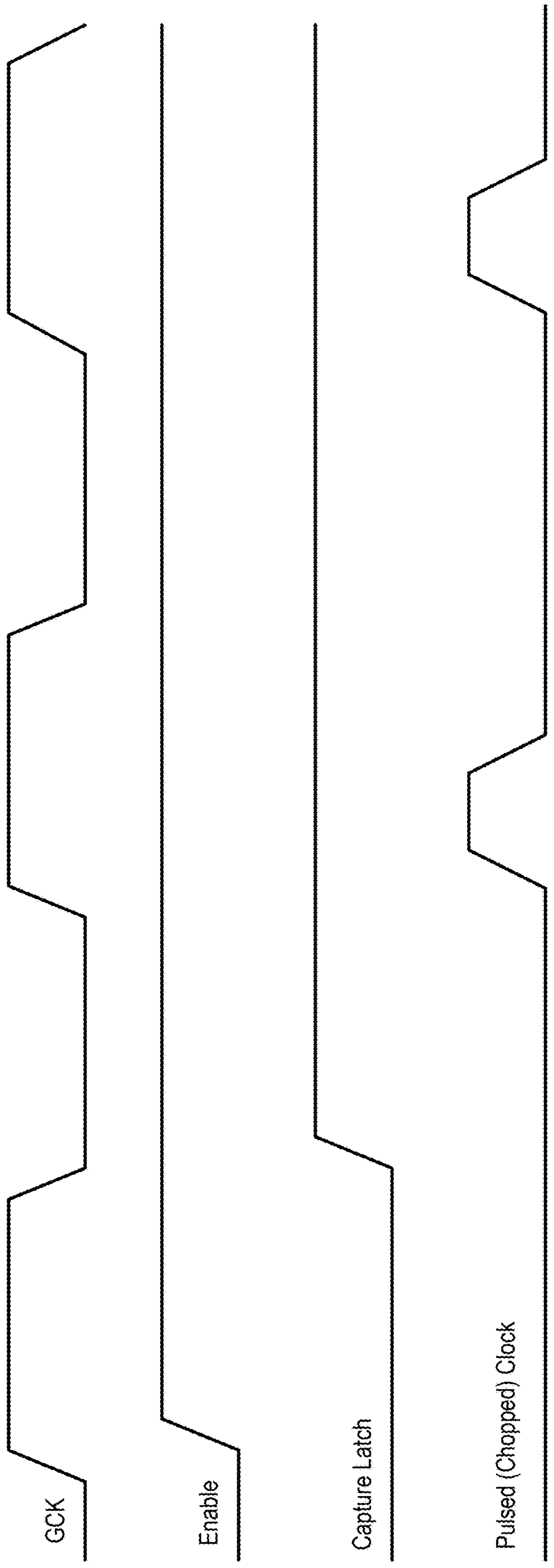
FIG. 5 sets forth a timing diagram for a local clock buffer for improved energy efficiency using a power saving micro-gating clock buffer in accordance with at least one embodiment of the present disclosure.

For further explanation, FIG. 5 sets forth a timing diagram for a local clock buffer for improved energy efficiency using a power saving micro-gating clock buffer in accordance with at least one embodiment of the present disclosure. The example timing diagram of FIG. 5 illustrates a GCK signal, a master enable signal (i.e., the output of enable gate 408), the value in the capture latch 410, and the chopped clock signal that is output by the common clock gate 412. It can be seen that the value of the master enable signal is latched in the capture latch on the falling edge of the GCK signal. This prevents clock glitches in the output of the common clock gate 412. Further, it can be seen that the pulse width of the chopped clock signal LCK is shorter than the pulse width of the GCK signal. This prevents an upstream latch from prematurely propagating data to a downstream latch when there is a value change during the active pulse. That is, the pulse window is narrowed to avoid an early mode problem. As long as the hold time of each micro-enable signal EN1, EN2 is as long as or longer than the pulse-width of the chopped clock signal LCK, there is no need for individual L1 capture latches for these micro-enable signals.

Figure 6:
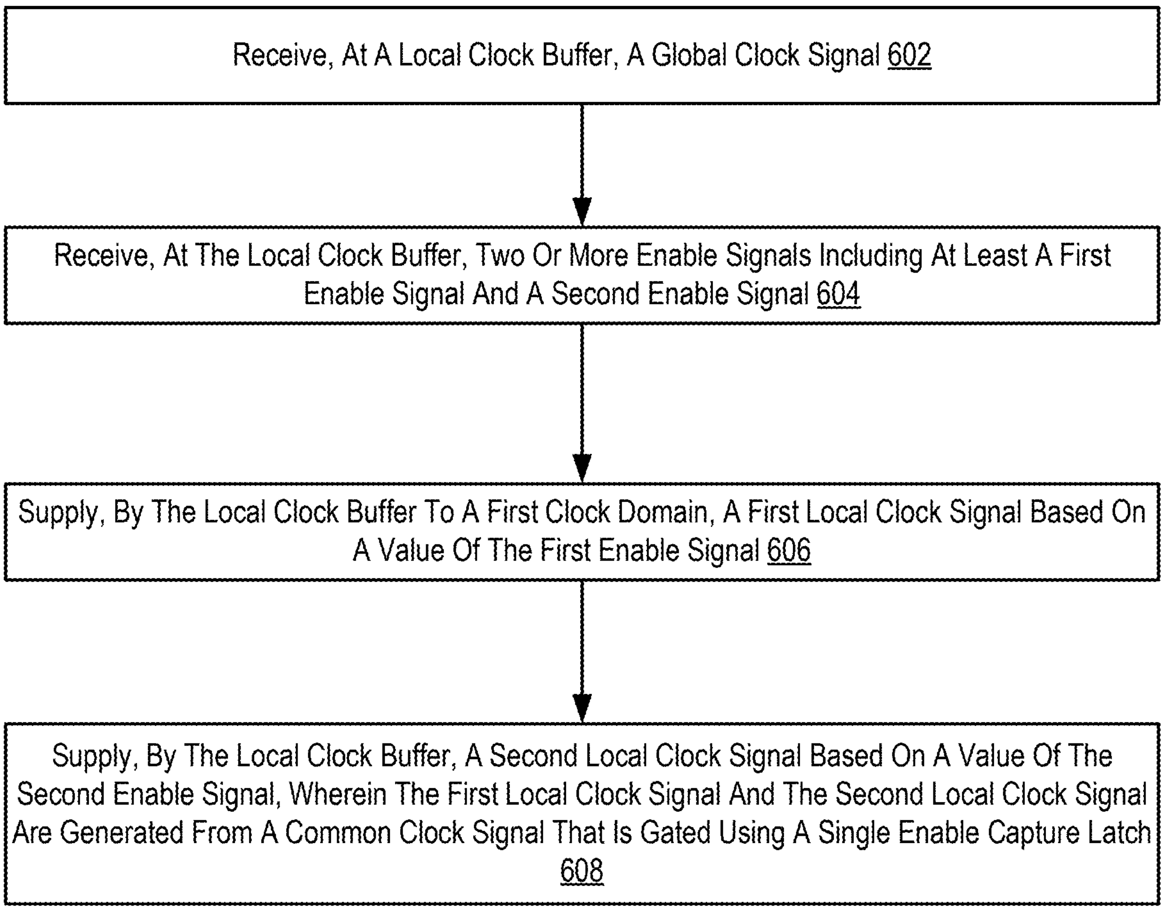
FIG. 6 sets forth a flow chart for an example method of improved energy efficiency using a power saving micro-gating clock buffer in accordance with at least one embodiment of the present disclosure.

For further explanation, FIG. 6 sets forth a flow chart of an example method for improved energy efficiency using a power saving micro-gating clock buffer in accordance with at least one embodiment of the present disclosure. The method of FIG. 6 includes receiving 602, at a local clock buffer, a global clock signal. As discussed above, in some examples the local clock buffer includes a grid node for receiving the global clock signal from the clock grid.

The method of FIG. 6 also includes receiving 604, at the local clock buffer, two or more enable signals including at least a first enable signal and a second enable signal. As discussed above, the local clock buffer includes multiple enable inputs for receiving multiple enable signals, where each enable signal corresponds to a respective clock domain coupled to the local clock buffer.

The method of FIG. 6 also includes supplying 606, by the local clock buffer to a first clock domain, a first local clock signal based on a value of the first enable signal. As discussed above, the local clock buffer uses the enable signals to determine whether a particular clock domain should receive a local clock signal. Micro-gating logic is used to gate a common clock signal. The micro-gating logic uses the enable signals as selectors.

The method of FIG. 6 also includes supplying 608, by the local clock buffer, a second local clock signal based on a value of the second enable signal; wherein the first local clock signal and the second local clock signal are generated from a common clock signal that is gated using a single enable capture latch. As discussed above, a master enable signal is asserted high whenever any of the enable inputs is high. This master enable signal is latched by a single latch and used to generate a common clock signal. The micro-gating logic gates the common clock signal to individual clock domains based on whether there is an active enable signal for that clock domain. Thus, the micro-gating logic also receives the enable signals received at the master enable gate.

In view of the foregoing, it will be appreciated that embodiments of the present disclosure improve the functioning of synchronous digital systems by providing fine grained control over dynamically enabling and disabling clock domains that are coupled to a single local clock buffer. Using micro-gating, one clock domain coupled to the clock buffer can be turned off when not in use even though another clock domain coupled to the local clock buffer is in use and receiving a local clock signal. This improves power conservation, reduces heat dissipation, and generates less noise. Multiple micro-clock domains can be driven from a single clock grid-connected clock buffer instead of one grid connection per clock domain. Micro-gating as described herein utilizes a common chopped clock, thus eliminating the need for latching micro-enables and saving always-on power connected to the clock grid. Further, always-on power is reduced through a master enable that shuts off the common chopped clock. When all enables are off, the intermediate chopped clock node stops switching, thus saving power at the clock buffer circuits. Still further, the free-running global grid clock does not have to drive the large gating elements at the local clock buffers.

Figure 7:
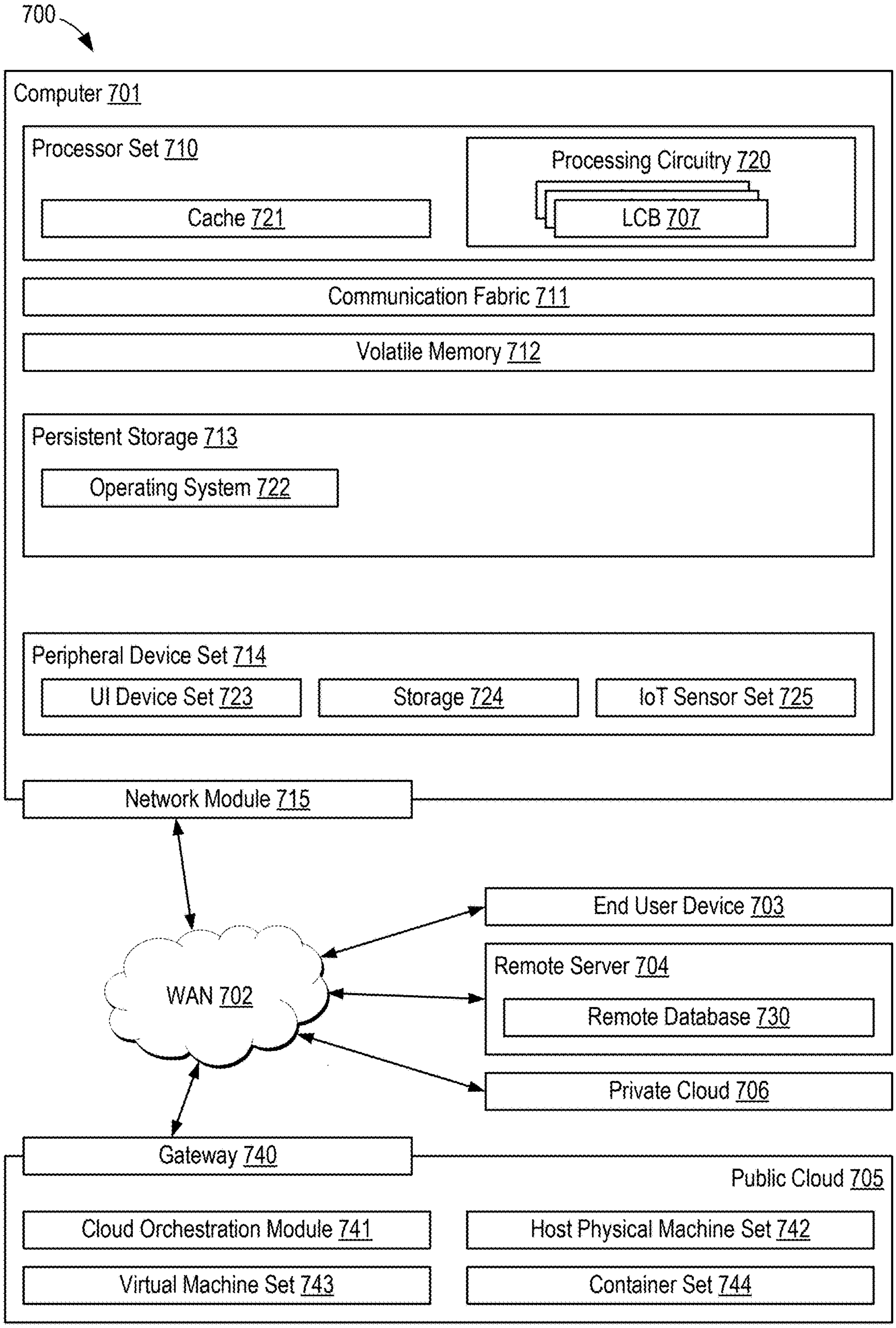
FIG. 7 sets forth an example computing environment according to aspects of the present disclosure.

FIG. 7 sets forth an example computing environment according to aspects of the present disclosure. Computing environment 700 contains an example of an environment for the execution of computer code. Computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing. Processing circuitry 720 includes at least one local clock buffer 707 for improved energy efficiency using a power saving micro-gating clock buffer in accordance with embodiments of the preset disclosure described above.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 721 and the other storage media discussed below. The program instructions, and associated data, are accessed by processor set 710 to control and direct performance of the computer-implemented methods. In computing environment 700, at least some of the instructions for performing the computer-implemented methods may be stored in persistent storage 713.

Communication fabric 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database), this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the computer-implemented methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A local clock buffer comprising:

a grid node configured to receive a global clock signal from a global clock grid;

an enable gate configured to output a master enable signal based on respective values of two or more enable signals;

an enable signal capture latch configured to store a value of the master enable signal, wherein the value of the master enable signal is stored by the enable signal capture latch without being stored in any other latch;

a clock gate configured to output, in dependence upon the value of the master enable signal, a pulsed clock signal based on the global clock signal; and micro-gating logic configured to:

receive the pulsed clock signal and the two or more enable signals; and output two or more local clock signals using the pulsed clock signal, wherein each local clock signal is selectively output based on a value of one of the two or more enable signals.

2. The local clock buffer of claim 1, wherein the two or more local clock signals are functional clock signals; and wherein only one enable signal capture latch is used for enabling the functional clock signals.

3. The local clock buffer of claim 1, wherein the enable gate outputs an asserted master enable signal when any of the two or more enable signals are asserted; and wherein the enable gate outputs an unasserted master enable signal when none of the two or more enable signals are asserted.

4. The local clock buffer of claim 1, wherein the local clock buffer is configured to drive two or more clock domains; and wherein each of the two or more local clock signals is provided to a respective one of the two or more clock domains.

5. The local clock buffer of claim 1, wherein the two or more local clock signals are enabled and disabled independent of one another, wherein the pulsed clock signal is output when at least one of the two or more enable signals is enabled, and the local clock buffer is not enabled when each of the two or more enable signals is disabled.

6. The local clock buffer of claim 5, wherein the two or more enable signals include a first enable signal and a second enable signal; wherein the two or more local clock signals include a first local clock signal and a second local clock signal; wherein the first enable signal enables the first local clock signal without enabling the second local clock signal; and wherein the second enable signal enables the second local clock signal without enabling the first local clock signal.

7. The local clock buffer of claim 1, wherein the pulsed clock signal output by the clock gate is a chopped clock signal.

8. A system comprising:

a global clock grid that propagates a global clock signal;

a local clock buffer coupled to the global clock grid; and two or more clock domains that each receive an independent local clock signal from the local clock buffer;

wherein the local clock buffer comprises:

an enable gate configured to output a master enable signal based on respective values of two or more enable signals;

an enable signal capture latch configured to store a value of the master enable signal, wherein the value of the master enable signal is stored by the enable signal capture latch without being stored in any other latch;

a clock gate configured to output, in dependence upon the value of the master enable signal, a pulsed clock signal based on the global clock signal; and micro-gating logic configured to:

receive the pulsed clock signal and the two or more enable signals; and output two or more local clock signals using the pulsed clock signal, wherein each local clock signal is selectively output based on a value of one of the two or more enable signals.

9. The system of claim 8, wherein the two or more local clock signals are functional clock signals; and wherein only one enable signal capture latch is used for enabling the functional clock signals.

10. The system of claim 8, wherein the enable gate outputs an asserted master enable signal when any of the two or more enable signals are asserted; and wherein the enable gate outputs an unasserted master enable signal when none of the two or more enable signals are asserted.

11. The system of claim 8, wherein each of the two or more enable signals corresponds to a respective one of the two or more clock domains.

12. The system of claim 8, wherein the two or more local clock signals are enabled and disabled independent of one another.

13. The system of claim 12, wherein the two or more enable signals include a first enable signal and a second enable signal; wherein the two or more local clock signals include a first local clock signal and a second local clock signal; wherein the first enable signal enables the first local clock signal without enabling the second local clock signal;

and wherein the second enable signal enables the second local clock signal without enabling the first local clock signal.

14. The system of claim 8, wherein the pulsed clock signal output by the clock gate is a chopped clock signal.

15. A method for improved energy efficiency using a power saving micro-gating clock buffer, the method comprising:

receiving, at a local clock buffer, a global clock signal;

receiving, at the local clock buffer, two or more enable signals including at least a first enable signal and a second enable signal;

supplying, by the local clock buffer to a first clock domain, a first local clock signal based on a value of the first enable signal; and supplying, by the local clock buffer, a second local clock signal based on a value of the second enable signal, wherein the first local clock signal and the second local clock signal are generated from a pulsed clock signal that is gated using a single enable signal capture latch, and wherein the pulsed clock signal is output when at least one of the two or more enable signals is enabled, and wherein the local clock buffer is not enabled when each of the two or more enable signals is disabled.

16. The method of claim 15, wherein the local clock buffer comprises:

a grid node configured to receive the global clock signal from a global clock grid;

an enable gate configured to output a master enable signal based on respective values of two or more enable signals;

the single enable signal capture latch configured to store a value of the master enable signal;

a clock gate configured to output, in dependence upon the value of the master enable signal, the pulsed clock signal based on the global clock signal; and micro-gating logic configured to:

receive the pulsed clock signal and the two or more enable signals; and output two or more local clock signals using the pulsed clock signal, wherein each local clock signal is selectively output based on a value of one of the two or more enable signals.

17. The method of claim 16, wherein the enable gate outputs an asserted master enable signal when any of the two or more enable signals are asserted; and wherein the enable gate outputs an unasserted master enable signal when none of the two or more enable signals are asserted.

18. The method of claim 16, wherein the local clock buffer is configured to drive two or more clock domains; and wherein the first local clock signal drives a first clock domain and the second local clock signal drives a second clock domain.

19. The method of claim 16, wherein the first local clock signal and the second local clock signal are enabled and disabled independent of one another.

20. The method of claim 16, wherein the pulsed clock signal output by the clock gate is a chopped clock signal.

* * * * *